(12) United States Patent
Vejmelka (10) Patent No.: US 10,198,576 B2
(45) Date of Patent: Feb. 5, 2019

(54) IDENTIFICATION OF MISLABELED SAMPLES VIA PHANTOM NODES IN LABEL PROPAGATION

(71) Applicant: Avast Software s.r.o., Prague (CZ)

(72) Inventor: Martin Vejmelka, Prague (CZ)

(73) Assignees: AVAST SOFTWARE S.R.O., Prague (CZ); USTAV INFORMATIKY AV CR, V.V.I., Prague (CZ)

( * ) Notice: Subject to any disclaimer, the term of this patent is extended or adjusted under 35 U.S.C. 154(b) by 118 days.

(21) Appl. No.: 15/374,865

(22) Filed: Dec. 9, 2016

(65) Prior Publication Data

US 2017/0169215 A1    Jun. 15, 2017

Related U.S. Application Data

(60) Provisional application No. 62/265,891, filed on Dec. 10, 2015.

(51) Int. Cl.
G06F 21/53    (2013.01)
G06F 21/56    (2013.01)

(52) U.S. Cl.
CPC ............ G06F 21/53 (2013.01); G06F 21/564 (2013.01)

(58) Field of Classification Search
CPC ................................ G06F 21/53; G06F 21/564
See application file for complete search history.

(56) References Cited

U.S. PATENT DOCUMENTS

| | | | |
|---|---|---|---|
| 8,379,979 B2 | 2/2013 | Yu et al. | |
| 8,671,069 B2 | 3/2014 | Chang et al. | |
| 8,825,744 B2 | 9/2014 | Wang et al. | |
| 9,002,072 B2 | 4/2015 | Tarnowski et al. | |
| 9,690,938 B1* | 6/2017 | Saxe | G06F 21/563 |
| 2013/0179974 A1* | 7/2013 | Manadhata | H04L 63/145 726/24 |

(Continued)

FOREIGN PATENT DOCUMENTS

WO    2010075408 A1    7/2010

OTHER PUBLICATIONS

Hu, Xin et al., "Large-Scale Malware Indexing Using Function-Call Graphs", CCS'09, Nov. 9-13, 2009, Chicago, Illinois, USA, pp. 611-620. (Year: 2009).*

(Continued)

*Primary Examiner* — Michael Pyzocha
(74) *Attorney, Agent, or Firm* — Husch Blackwell LLP (57) ABSTRACT

Systems and method identify potentially mislabeled file samples. A graph is created from a plurality of sample files. The graph includes nodes associated with the sample files and behavior nodes associated with behavior signatures. Phantom nodes are created in the graph for those sample files having a known label. During a label propagation operation, a node receives data indicating a label distribution of a neighbor node in the graph. In response to determining that the current label for the node is known, a neighborhood opinion is determined for the associated phantom node, based at least in part on the label distribution of the neighboring nodes. After the label propagation operation has completed, differences between the neighborhood opinion and the current label distribution for nodes are determined. If the difference exceeds a threshold, then the current label may be incorrect.

19 Claims, 5 Drawing Sheets

(56) References Cited

U.S. PATENT DOCUMENTS

| | | | |
|---|---|---|---|
| 2014/0201208 A1* | 7/2014 | Satish | G06F 21/564 707/737 |
| 2014/0226889 A1 | 8/2014 | Liu et al. | |
| 2015/0379264 A1* | 12/2015 | Alme | G06F 21/564 726/23 |
| 2016/0277423 A1* | 9/2016 | Apostolescu | H04L 63/145 |
| 2017/0011091 A1* | 1/2017 | Chehreghani | G06F 17/30477 |

OTHER PUBLICATIONS

Kong et al., Transductive Malware Label Propagation: Find Your Lineage From Your Neighbors, IEEE Conference on Computer Communications, IEEE Infocom 2014, 2014, pp. 1411-1419.
Silva et al., Detecting and Preventing Error Propagation via Competitive Learning, Procedia Computer Science, 2012 pp. 192-197, vol. 13, Elsevier B.V.

* cited by examiner

IDENTIFICATION OF MISLABELED SAMPLES VIA PHANTOM NODES IN LABEL PROPAGATION

CROSS-REFERENCE TO RELATED APPLICATIONS

This Application claims priority to U.S. Provisional Patent Application Ser. No. 62/265,891, filed on Dec. 10, 2015, to Martin Vejmelka, entitled "Identification of Mislabeled Samples Via Phantom Nodes in Label Propagation,", the entire disclosure of which is incorporated herein by reference.

FIELD

The disclosure relates generally to labeling malware files, and more particularly, to identifying malware files that have been mislabeled using phantom nodes in label propagation.

BACKGROUND OF THE INVENTION

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed.

In the face of the growing threat of malware, many anti-malware software packages were developed to detect malware in a user's files. Upon detection, the anti-malware software may notify the user of the presence of the malware, and may automatically remove or quarantine the malware. In order to detect malware, anti-malware software vendors identify malware in files using signatures or behavior of the files. The signatures can be provided to client software that detects malware on end-user machines. In some cases however, files may be mislabeled. For example, a file may be labeled as malware when in fact it does not contain malware (i.e. a false positive). Alternatively, a file may be labeled as clean when in fact it contains malware (i.e. a false negative). Further, the file may be labeled as having a first type of malware when in fact it has a second type of malware.

The mislabeling of files can have serious consequences. For example, a file that is mislabeled as malware can cause a user to remove an otherwise useful application and interfere with a user's work flow. A file that is mislabeled as clean can cause a user's computer to become infected by the malware. In either case, the mislabeling can have a serious impact on the reputation of the anti-malware software provider.

SUMMARY OF THE INVENTION

Systems and methods enable (i) creating a graph from a plurality of sample files, the graph including sample file nodes associated with the sample files and behavior nodes associated with behavior signatures, wherein edges in the graph connect a behavior node with a set of one or more sample file nodes, wherein the one or more files associated with the one or more sample file nodes exhibit the behavior signature associated with the behavior node, (ii) receiving data indicating a label distribution of a neighbor node of a sample file node in the graph, (iii) in response to determining that a current label for the sample file node is unknown, setting the current label distribution for the sample file node to a consensus of label distributions of neighboring nodes; and (iv) in response to determining that the current label for the sample file node is known, performing operations including: creating a phantom node associated with the sample file node, determining a neighborhood opinion for the phantom node, based at least in part on the label distribution of the neighboring nodes, determining a difference between the neighborhood opinion and the current label for the sample file node, and determining whether the current label is incorrect based, at least in part, on the difference.

BRIEF DESCRIPTION OF THE DRAWINGS

For a better understanding of the inventive subject matter, reference may be made to the accompanying drawings in which.

DETAILED DESCRIPTION OF THE INVENTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
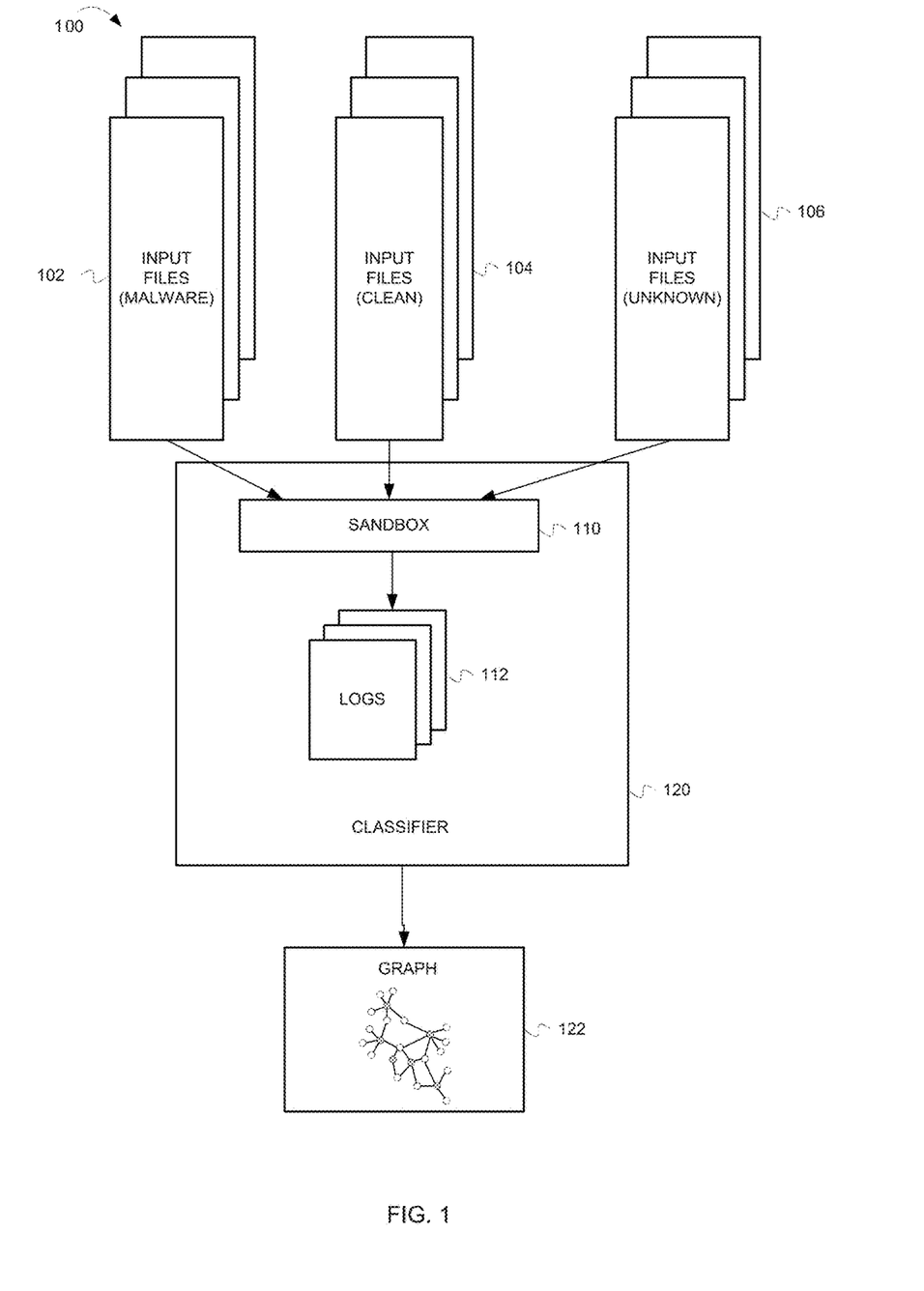
FIG. 1 is a block diagram of illustrating components of an operating environment of a system for identifying mislabeled samples using phantom nodes in label propagation.

FIG. 1 is a block diagram of illustrating components of a system 100 for identifying mislabeled samples using phantom nodes in label propagation. In some embodiments, system 100 includes a classifier 120 that analyzes input files and produces a graph 122 that has labeled nodes describing the input files. In some embodiments, the input files can be labeled as malware, clean or unknown. Input files 102 can comprise files that have been determined to include malware of various types. Each file in the set of input files 102 is known to contain some type of malware. In some aspects, the malware in input files 102 may have been identified using machine learning techniques or manual techniques. It should be noted that the determination of malware may be erroneous. That is, some of the files in input files 102 may be indicated to contain malware, but in fact do not contain malware.

Clean input files 104 have been determined to be free of malware. Again, the determination may be erroneous. That is, the file may be indicated to be clean, but in fact may contain unidentified malware.

In addition, classifier may receive a set of input files 106 where it is unknown whether or not the files contain malware.

Classifier 120 receives some or all of the input files 102, 104 and 106, and executes each of the input files in sandbox 110. Sandbox 110 is an execution environment that isolates the running code in an input file from the operating system, network devices, and storage devices of the classifier system 120 so that the malware does not affect (i.e., infect) classifier system 120. For example, sandbox 110 may be a virtual machine that provides a virtual operating system, virtual storage, and virtual network devices for access by the executable code in the input file.

In some aspects, sandbox 110 produces a log 112 when an executable file is executed within sandbox 110. The log 112 may include data indicating the operating system calls and call parameters invoked by the executable file when running in sandbox 110. The log 112 is saved and can be used by classifier 120 to analyze the behavior of the executable input file. For example, classifier 120 can analyze the logs produced by executing the input files to determine if the executable has a behavior that is similar to malware. For example, a particular type of malware may exhibit a particular pattern of system calls and/or system call parameters. Executable files that produce a sandbox log 112 that have similar behavior (e.g., a similar pattern of system calls and system call parameters) may be identified as containing the same type of malware.

In some embodiments, the analysis of the logs 112 produced by running the executable input files in sandbox 110 can be used to produce a graph 122. In some aspects, the graph has two types of nodes (also referred to as vertices). A first type of node represents an input file. A second type of node represents a shared behavioral signature as determined by classifier 120 from logs 112. The first type of node may include data that is a label for the node. The label may indicate that the file associated with the node contains a type of malware, that the file is clean (i.e., free of malware), or that it unknown whether or not the file associated with the node contains malware. Edges in the graph connect file nodes to behavior nodes. The file nodes connected to a particular behavior node share the behavior indicated by the behavior node.

Figure 2:
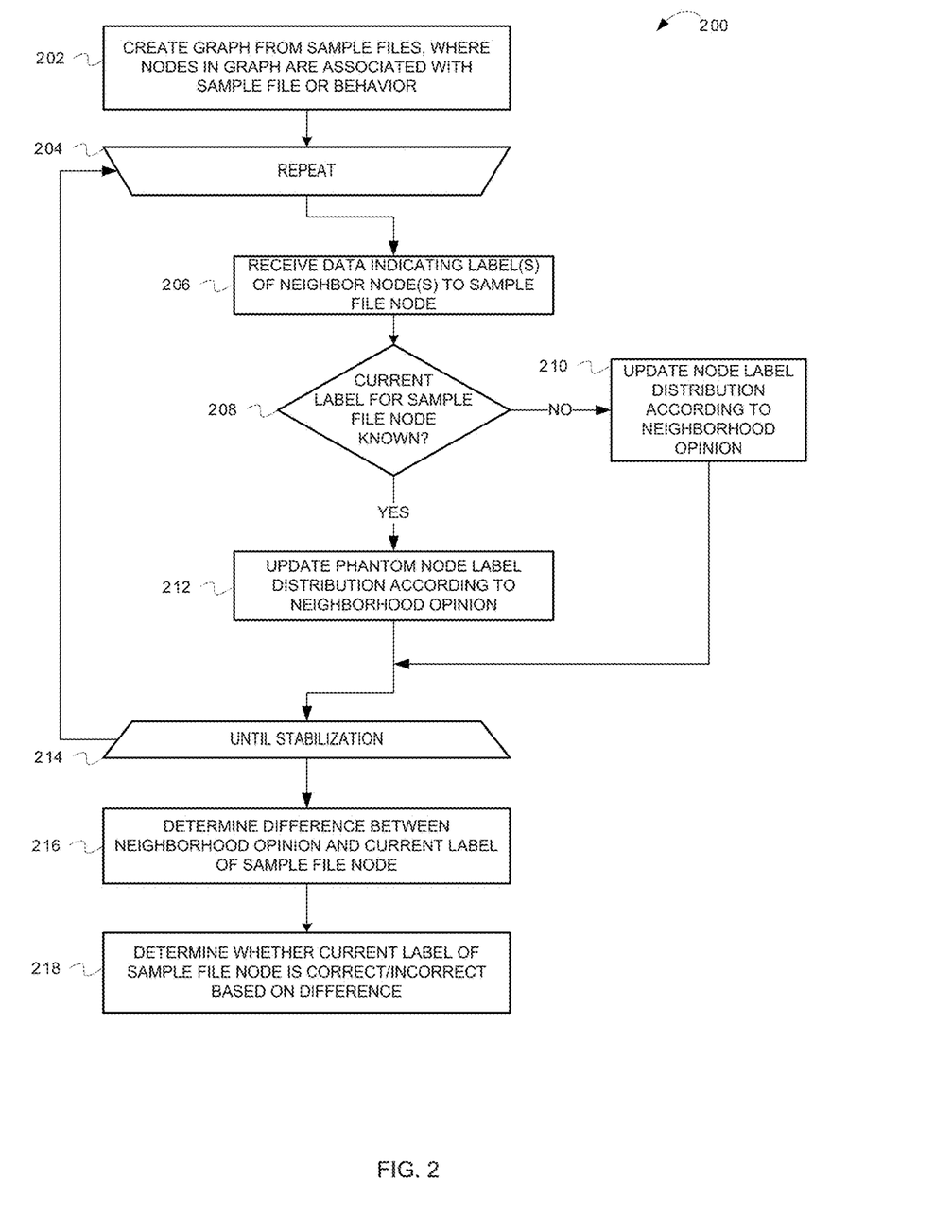
FIG. 2 is a flow chart illustrating operations of a method for identifying mislabeled samples using phantom nodes in label propagation.
Figure 3:
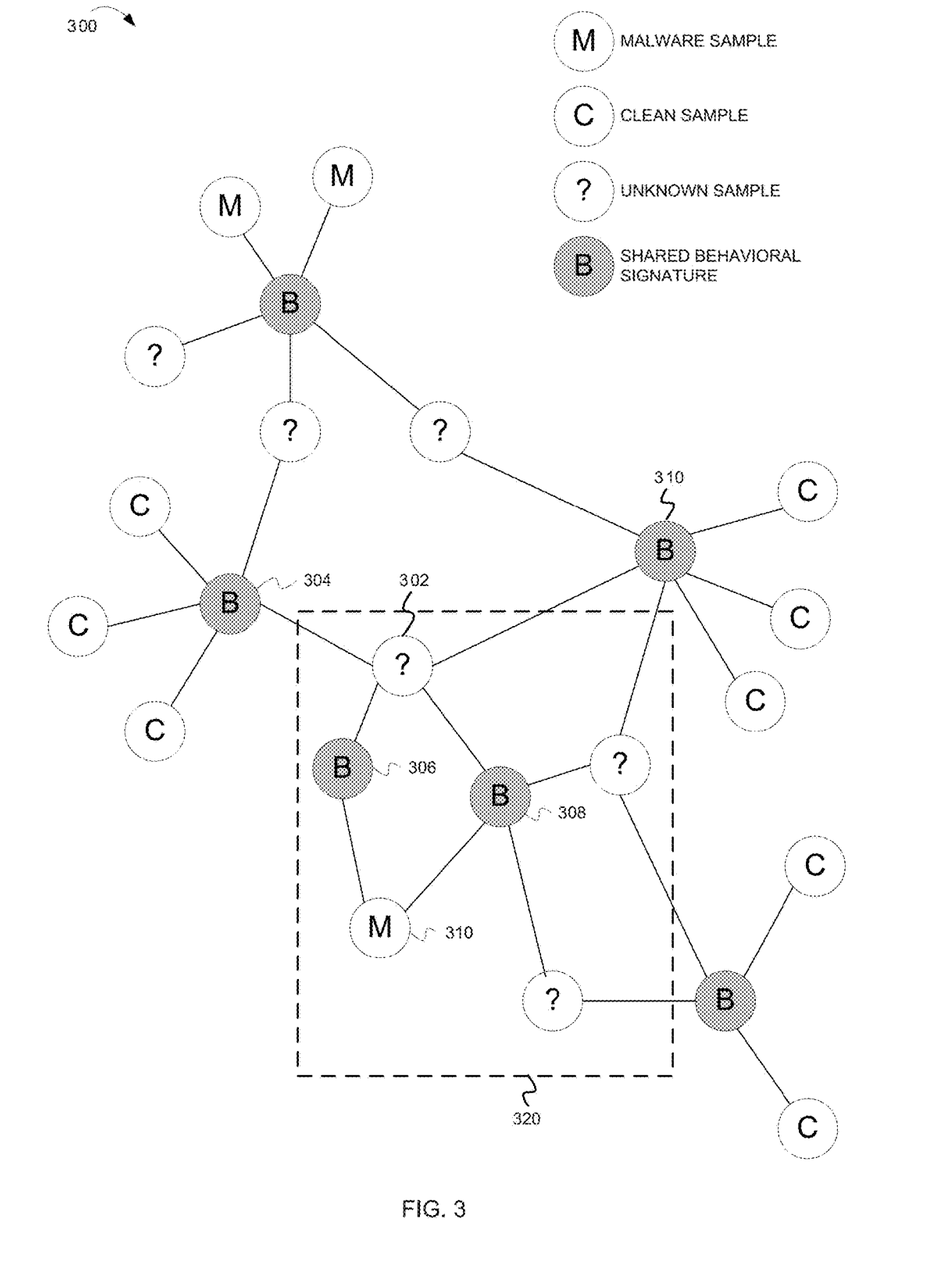
FIG. 3 is an example graph used to illustrate identification of mislabeled samples.
Figure 4:
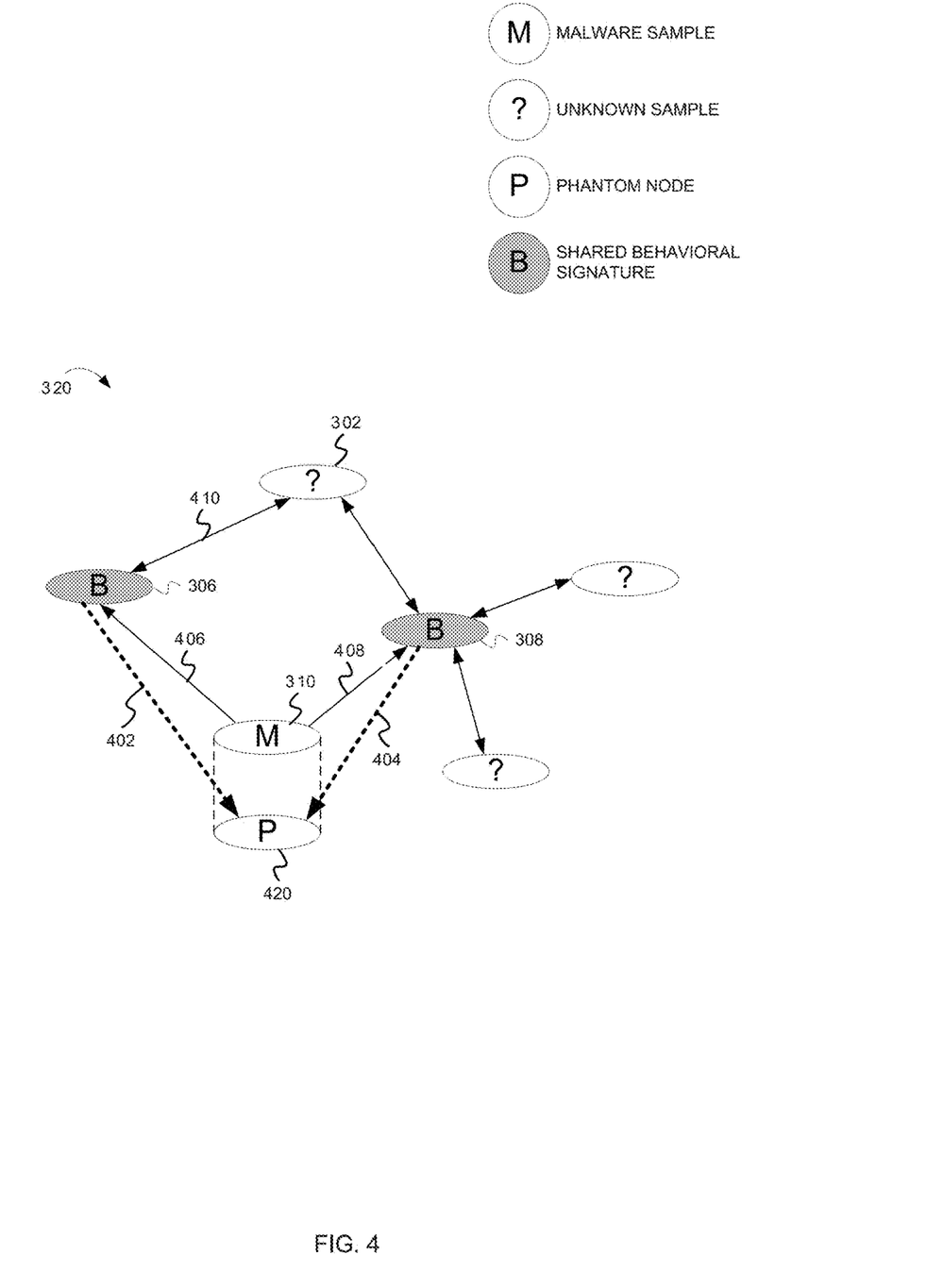
FIG. 4 is an example graph providing an example of a phantom node for the example graph illustrated in FIG. 3.

Further details on the operation of classifier 120 will now be provided with reference to FIGS. 2, 3 and 4.

FIG. 2 is a flow chart illustrating operations 200 of a method for identifying mislabeled samples using phantom nodes in label propagation. At block 202, an algorithm creates a graph from sample input files that have been classified. As noted above, a first type of node in the graph can be associated with one of the input files and a second type of node in the graph can be associated with a particular behavior discovered by classifier 120. Various mechanisms may be used to determine behaviors exhibited by sample files. In some embodiments, the behaviors of the input sample files and sample files exhibiting the same or similar behavior can be determined as described in U.S. Provisional Patent Application No. 62/265,790, entitled "DISTANCE AND METHOD OF INDEXING SANDBOX LOGS FOR MAPPING PROGRAM BEHAVIOR," which is hereby incorporated by reference herein for all purposes. The file nodes can be connected to a behavior node by an edge. All of the files that are connected to a particular behavior node share (i.e., exhibit) the behavior indicated by the behavior node. Some of the nodes in the graph may be assigned a label indicating the sample file associated with the node contains malware, is clean (i.e. free of malware) or it is unknown whether the sample file contains malware or not. For example, some of the sample files from a database of input files may have a previous classification (either automated or manual) that previously determined that the sample files contain known malware or are known to be free of malware. In some aspects, a "potentially unwanted program" can be included as a malware type. In other aspects, potentially unwanted programs can be labeled separately from malware. For those nodes that are labeled, a phantom node is created.

Block 204 indicates the start of an iterative label propagation operation. During label propagation, label distribution data can propagate from one node to other nodes. Blocks 206-212 can be executed for sample file nodes in the graph during the label propagation operation. The operations in blocks 206-212 are described with reference to a current iteration for a current sample file node, and can be repeated for other sample file nodes in the graph 122. Additionally, blocks 206-212 may be repeated for a node in subsequent iterations, as labels are propagated through the nodes in a back and forth fashion.

At block 206, data is received that indicates the label distributions of one or more neighbor nodes to a current sample file node. In some aspects the neighbor nodes can be nodes that are connected to the same behavior node as the current sample file node.

At block 208, a check is made to determine if the current sample file node has been assigned a label.

If the current sample file node has not been assigned a label (or assigned a label indicating "unknown" or similar value), then the classifier proceeds to block 210 to update the current node's label distribution for the current sample file node according to a neighborhood opinion that is determined by the data received for the one or more neighbor nodes. The classifier then proceeds to block 214 and the method ends with respect to a current iteration for the current sample file node. Blocks 206-212 can be repeated for other sample file nodes. This can cause their label distribution to change, after which this process may be repeated for the current node during later iterations.

If the check at block 208 determines that the current sample file node has already been assigned a label (or been assigned a label that is not "unknown" or similar value), then at block 212, the data indicating the label distributions for the neighbor nodes is used to determine a neighborhood opinion that can be associated with the phantom node. The neighborhood opinion can be an expression of the consensus of the neighboring nodes as to what the label distribution of the current sample file node should be. In some aspects, each node keeps track of its distribution of labels (e.g., clean, malware and potentially unwanted program labels). In some aspects, the label distribution can be represented by three non-negative numbers (one for each label type) that add to one. During label propagation, each node receives the messages (i.e., the distribution of labels and weights associated with the labels) from its neighbors, and calculates a sum of these distributions. In some aspects, the sum can be a weighted sum of the label distributions. The node replaces its current label distribution with the newly calculated label distribution.

Block 214 indicates the end of an iteration of the label propagation operation. In some aspects, the label propagation operation continues (i.e., returns to block 204) until changes in the neighborhood opinions (see e.g., blocks 210 and 212) are small enough, e.g., below a predefined or configurable threshold. When the changes are small enough and the label distribution settles for all nodes, then the graph has stabilized and the label propagation operation can be considered complete.

After completion of the label propagation operation, a stress level can be determined for the nodes in the graph having an associated phantom node. Nodes having a suspicious label distribution can be identified based on the stress level. Blocks 216 and 218 can be executed for each node in the graph that has an associated phantom node after the label propagation operation has finished.

At block 216, the classifier determines a difference between the neighborhood opinion and the current label distribution of the current sample file node. The difference may be referred to as "stress" of the node. In some aspects, the difference, or stress, can be a number in the range of 0-1. As an example assume that the order of labels is clean, malware, and pup. In this example, a known malware node would have a distribution concentrated on the malware label. Thus, a known malware node would be $x_1=(0, 1, 0)$. As described above, the incoming messages are processed in the phantom node. For the purposes of the example, assume that the values processed in the phantom node result in label weights of (0.8, 0.2, 0). In some aspects, the 'stress' of a node as calculated as one half of the $l_1$ norm of the difference between the current label and the neighborhood opinion of the label, which is one half of the sum of absolute differences. For the example node above, the stress is: $0.5*(|0-0.8|+|1-0.2|+|0-0|)=0.5*1.6=0.8$. For example, a value of 0.98 would indicate that practically all the neighbors have a completely different distribution (thus affecting the phantom node). It should be noted that other mechanisms for determining the difference can be used and are within the scope of the inventive subject matter.

At block 218, the classifier utilizes the difference to determine if the current label of the current sample file node is incorrect. For example, if the difference is above a predetermined or configurable threshold, then the current label may be determined by the classifier to be incorrect.

If a current label is determined to be incorrect, then various remedial actions may be taken. For example, in some aspects, the current node or the sample file associated with the current node can be flagged for further analysis. In some aspects, the sample file associated with the flagged node can be manually analyzed. In alternative aspects, the sample file can be automatically analyzed by one or more malware detection tools to determine what the correct label should be.

FIG. 3 is an example graph 300 used to illustrate identification of mislabeled samples according to the above-described systems and methods. The example graph can be a graph 122 produced by classifier 120 (FIG. 1). In the example illustrated in FIG. 3, nodes that have been labeled as "malware" are indicated with an "M." Nodes that have been labeled as clean (i.e., free of malware) are indicated with a "C." Nodes where it is unknown whether the sample file contains malware or is clean are indicated with a question mark "?." Shaded nodes indicated with a "B" are behavior nodes that indicate a particular behavior. The shared behavior signature may be associated with a behavior signature as determined by classifier 120 or some other malware detection/analysis tool.

Sample file nodes may have multiple behaviors associated with the node. In the example illustrated in FIG. 3, sample file node 302 exhibits multiple behaviors as indicated by edges connecting sample file node 302 to behavior nodes 304, 306, 308 and 310. The multiple behaviors may indicate a conflict or error in classification. For example, some behaviors are shared with many malware samples while other behaviors are shared primarily with clean samples. Alternatively, the multiple behaviors may indicate that the file exhibits multiple malicious behaviors.

FIG. 4 is an example graph providing an example of a phantom node for the example graph illustrated in FIG. 3. In particular, FIG. 4 illustrates a portion 320 of graph 300. In the example illustrated in FIG. 4, a phantom node 420 has been created and associated with sample file node 310 having a known label indicating that the sample file associated with sample file node 310 contains malware. Data flow in the graph portion 320 can be visualized as messages between nodes. In the example illustrated in FIG. 4, for nodes having an label of "unknown", data flow can be bidirectional as illustrated by bidirectional arrows 408 and 410. However, for sample file nodes where a label is known (e.g., either malware or clean), data flow is redirected. For example, data flowing into the sample file node 310 from label data propagated from other nodes is redirected to the associated phantom node 420. The propagated data can be used as described above to determine a neighborhood opinion (i.e., neighborhood consensus) for the label for phantom node 420. Label data propagated from node 310 to other nodes can follow the conventional paths during label propagation and is not redirected.

As noted above, a stress, can be calculated based on the difference between the neighborhood opinion and current label for a current sample file node. In some aspects, the weight assigned to data flowing from a current sample file node to other neighbor nodes can be weighted according to the stress value. This can be desirable, because the weighting can be used to decrease the influence of nodes where the stress value is high (i.e., nodes that are more likely to have been mislabeled).

The description above has been provided in the context of using behavioral signatures of sample files to link nodes in a graph. Other properties could be used instead of, or in addition to behavioral signatures. For example, a shared installation path or properties of an executable file envelope could be used.

Further, it should be noted that while the above-described systems and methods have been described in the context of anti-malware software tools and methods, the inventive subject matter is not limited to such environments. The above-described systems and methods may be applied to many other environments that utilize label propagation in graphs.

Figure 5:
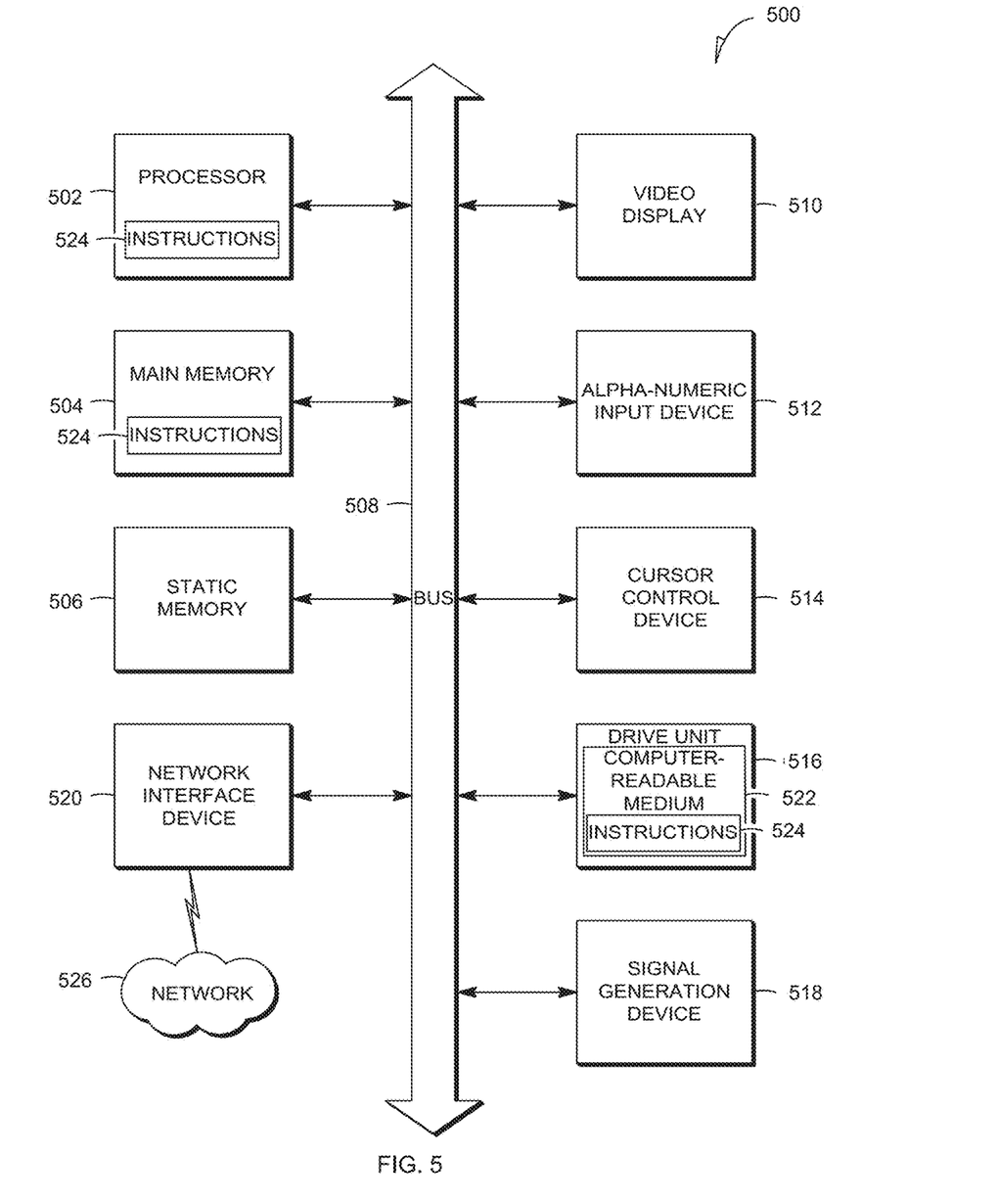
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for protecting computing devices from mislabeled malware, the method comprising:
    creating a graph from a plurality of sample executable files by executing the sample executable files in an isolated execution environment, the graph including sample file nodes associated with the sample executable files and behavior nodes associated with behavior signatures, wherein edges in the graph connect a behavior node with a set of one or more sample file nodes, wherein the one or more sample executable files associated with the one or more sample file nodes exhibit the behavior signature associated with the behavior node;
    receiving data indicating a label distribution of a neighbor node of a sample file node in the graph;
    in response to determining that a current label for the sample file node is unknown, setting the current label distribution for the sample file node to a consensus of label distributions of neighboring nodes;
    in response to determining that the current label for the sample file node is known, performing operations including:
        creating a phantom node associated with the sample file node,
        determining a neighborhood opinion for the phantom node, based at least in part on the label distribution of the neighboring nodes,
        determining a difference between the neighborhood opinion and the current label for the sample file node, and
        determining whether the current label is incorrect based, at least in part, on the difference; and
    in response to determining that the current label for the sample file node is incorrect, performing at least one remedial action on the sample executable file associated with the sample file node having the incorrect current label.

2. The computer-implemented method of claim 1 further comprising performing an iterative label propagation operation.

3. The computer-implemented method of claim 1, wherein the at least one remedial action comprises flagging at least one of the current node and the sample executable file associated with the current node for further analysis.

4. The computer-implemented method of claim 1 wherein the at least one remedial action comprises applying at least one malware detection tool to determine what the current label should be.

5. The computer-implemented method of claim 1, wherein the current label indicates that the sample executable file associated with current label contains malware and wherein said determining whether the current label is incorrect comprises determining that the sample executable file associated with the current label does not contain malware.

6. The computer-implemented method of claim 1, wherein the current label indicates that the sample executable file associated with current label is free of malware and wherein said determining whether the current label is incorrect comprises determining that the sample executable file associated with the current label does contain malware.

7. The method of claim 1, wherein the at least one remedial action comprises decreasing an influence of the sample file node during propagation of the current label by weighting data flowing from the sample file node to neighboring nodes according to the determined difference between the neighborhood opinion and the current label for the sample file node.

8. A system comprising:
    at least one processor; and
    a non-transitory computer readable storage medium having a program stored thereon, the program causing the at least one processor to execute the steps of:
    (a) creating a graph from a plurality of sample executable files by executing the sample executable files in an isolated execution environment, the graph including sample file nodes associated with the sample executable files and behavior nodes associated with behavior signatures, wherein edges in the graph connect a behavior node with a set of one or more sample file nodes, wherein the one or more sample executable files associated with the one or more sample file nodes exhibit the behavior signature associated with the behavior node;
    (b) receiving data indicating a label distribution of a neighbor node of a sample file node in the graph;
    (c) in response to determining that a current label for the sample file node is unknown, setting the current label distribution for the sample file node to a consensus of label distributions of neighboring nodes,
    (d) in response to determining that the current label for the sample file node is known, performing operations including:
        (i) creating a phantom node associated with the sample file node,
        (ii) determining a neighborhood opinion for the phantom node, based at least in part on the label distribution of the neighboring nodes,
        (iii) determining a difference between the neighborhood opinion and the current label for the sample file node, and (iv) determining whether the current label is incorrect based, at least in part, on the difference; and (e) in response to determining that the current label for the sample file node is incorrect, performing at least one remedial action on the sample executable file associated with the sample file node having the incorrect current label.

9. The system of claim 8, wherein the program further performs causes the at least one processor to perform an iterative label propagation operation.

10. The system of claim 8, wherein the at least one remedial action comprises flagging at least one of the current node and the sample executable file associated with the current node for further analysis.

11. The system of claim 8, wherein the at least one remedial action comprises applying at least one malware detection tool to determine what the current label should be.

12. The system of claim 8, wherein the current label indicates that the sample executable file associated with current label contains malware and wherein said determining whether the current label is incorrect comprises determining that the sample executable file associated with the current label does not contain malware.

13. The system of claim 8, wherein the current label indicates that the sample executable file associated with current label is free of malware and wherein said determining whether the current label is incorrect comprises determining that the sample executable file associated with the current label does contain malware.

14. A non-transitory computer readable storage medium comprising a set of instructions executable by a computer, the non-transitory computer readable storage medium comprising:

instructions for creating a graph from a plurality of sample executable files by executing the sample executable files in an isolated execution environment, the graph including sample file nodes associated with the sample executable files and behavior nodes associated with behavior signatures, wherein edges in the graph connect a behavior node with a set of one or more sample file nodes, wherein the one or more sample executable files associated with the one or more sample file nodes exhibit the behavior signature associated with the behavior node;

instructions for receiving data indicating a label distribution of a neighbor node of a sample file node in the graph;

instructions for, in response to determining that a current label for the sample file node is unknown, setting the current label distribution for the sample file node to a consensus of label distributions of neighboring nodes;

instructions for, in response to determining that the current label for the sample file node is known, performing operations including:

creating a phantom node associated with the sample file node, determining a neighborhood opinion for the phantom node, based at least in part on the label distribution of the neighboring nodes, determining a difference between the neighborhood opinion and the current label for the sample file node, and determining whether the current label is incorrect based, at least in part on the difference; and instructions for, in response to determining that the current label for the sample file node is incorrect, performing at least one remedial action on the sample executable file associated with the sample file node having the incorrect current label.

15. The non-transitory computer readable storage medium of claim 14 further comprising instructions for performing an iterative label propagation operation.

16. The non-transitory computer readable storage medium of claim 14, wherein the at least one remedial action comprises flagging at least one of the current node and the sample executable file associated with the current node for further analysis.

17. The non-transitory computer readable storage medium of claim 14, wherein the at least one remedial action comprises applying at least one malware detection tool to determine what the current label should be.

18. The non-transitory computer readable storage medium of claim 14, wherein the current label indicates that the sample executable file associated with current label contains malware, further comprising instructions for determining that the sample executable file associated with the current label does not contain malware.

19. The non-transitory computer readable storage medium of claim 14, wherein the current label indicates that the sample executable file associated with current label is free of malware, further comprising instructions for determining that the sample executable file associated with the current label does not contain malware.

* * * * *